(12) United States Patent
Von Baeumen et al.

(10) Patent No.: US 7,401,466 B2
(45) Date of Patent: Jul. 22, 2008

(54) HYDRAULIC DRIVE, IN PARTICULAR FOR TWO-CYLINDER THICK MATTER PUMPS

(75) Inventors: Paul Von Baeumen, Sindelfingen (DE); Dirk Hoevemeyer, Dettingen (DE); Hans Renz, Filderstadt (DE)

(73) Assignee: Putzmeister Aktiengesellschaft, Aichtal (DE)

( * ) Notice: Subject to any disclaimer, the term of this patent is extended or adjusted under 35 U.S.C. 154(b) by 20 days.

(21) Appl. No.: 10/592,396

(22) PCT Filed: Feb. 2, 2006

(86) PCT No.: PCT/EP2006/001432

§ 371 (c)(1),
(2), (4) Date: Sep. 8, 2006

(87) PCT Pub. No.: WO2006/089688

PCT Pub. Date: Aug. 31, 2006

(65) Prior Publication Data

US 2007/0204608 A1    Sep. 6, 2007

(30) Foreign Application Priority Data

Feb. 22, 2005    (DE) .................. 10 2005 008 217

(51) Int. Cl.
*F16D 31/02*    (2006.01)
*F15B 13/06*    (2006.01)
*F15B 21/02*    (2006.01)

(52) U.S. Cl. ............... 60/464; 60/394; 91/35; 91/520

(58) Field of Classification Search ............ 60/394, 60/464, 488; 91/35, 189 R, 520; 417/342, 417/344, 345

See application file for complete search history.

(56) References Cited

U.S. PATENT DOCUMENTS

| 5,238,371 | A | * | 8/1993 | Benckert | ............ 417/345 |
| 5,344,290 | A | * | 9/1994 | Benckert | ............ 417/342 |
| 6,171,075 | B1 | * | 1/2001 | Munzenmaier et al. | ..... 417/342 |

* cited by examiner

*Primary Examiner*—Michael Leslie
(74) *Attorney, Agent, or Firm*—Patent Central LLC; Stephan Pendorf (57) ABSTRACT

The invention relates to a hydraulic drive, especially for two-cylinder thick matter pumps. Said hydraulic drive comprises at least one main pump (10) embodied as a hydraulic variable displacement pump, and two hydraulically actuatable drive cylinders (20, 22) that are each connected to a connection line (16, 18) of the main pump (10) by means of pump connections mounted on one end thereof, forming a closed hydraulic circuit, and communicate with each other at the ends thereof opposing the pump connections (24, 26) by means of a swinging oil line (28). The hydraulic drive also comprises a feed pump (42), by which means pressurized oil is fed from an oil tank to the current low-pressure side into the hydraulic circuit, and a flushing branch (52), by which means a flushing oil flow is branched off from the current low-pressure side under a limited pressure into the oil tank (44). In order to avoid low-pressure influxes during the reversal process of the main pump (10), the flushing oil flow is blocked and then released in a time-delayed manner during each reversal process of the main pump (10), independently of the differential pressure in the connection lines.

12 Claims, 7 Drawing Sheets

HYDRAULIC DRIVE, IN PARTICULAR FOR TWO-CYLINDER THICK MATTER PUMPS

CROSS REFERENCE TO RELATED APPLICATION

This application is a national stage of PCT/EP2006/001432 filed on Feb. 17, 2006 and based upon Application No. 10 2005 008 2173.3 filed on Feb. 22, 2005 under the International Convention.

BACKGROUND OF THE INVENTION

1. Field of the Invention

The invention concerns a hydraulic drive, in particular for a two-cylinder thick matter pump of the general type described in the pre-characterizing portion of claim 1.

2. Description of Related Art

Known hydraulic drives of this type include at least one main pump embodied as a hydraulic variable displacement pump as well as two hydraulically actuated drive cylinders embodied as piston cylinder units. The drive cylinders are connected at their one end via pump connections with respectively one of two connection lines of the main pump, forming a closed hydraulic circuit, while on their end opposite to the pump connections they are in communication with each other via an oscillating hydraulic line. The main pump, which is embodied as a reciprocating pump, is further connected with a control mechanism for alternatingly reversing the direction of flow with reciprocal building up of high pressure and a pre-tensioned low pressure in the two connection lines. Further, a hydraulic feed pump is provided, of which the suction inlet is connected to a hydraulic oil tank and the pressure outlet is set to a predetermined low pressure level and communicates with the two connection lines of the main pump via respectively one one-way valve. Since the hydraulic oil heats up during the pumping process, a sump or flushing branch is supplementally provided, which on the outlet side communicates with the oil tank via a pressure limiting valve and on the inlet side is respectively connectable with the low pressure part of the hydraulic circuit. For this purpose there is located in the flushing branch a reciprocating valve pre-controlled by the pressure differential existing between the connection lines of the main pump, which in the case that there is a prevailing pressure differential, directs flow towards the respective low pressure side connection pipe which is accompanied by discharging of a sump stream into the oil sump tank, and in the case that there is no pressure differential is in a blocked intermediate position. The amount of oil discharged during the flushing process corresponds to approximately 50-70% of the oil amount continuously re-supplied from the oil tank by the feed pump. Due to the mass inertia and the compressibility in the system, substantial pressure oscillations result within the hydraulic system during the reversal process of the reversible pump. During the reversing process the pivot angle of the adjustable pump is retracted. Thereby the volumetric displacement of the reversible pump becomes lower. Since the system is still on line, the high pressure drops while in equal value the low pressure increases. This means that the low pressure side experiences a rapid pressure increase so long as the reverse valve in the flushing cycle is not yet redirected. This leads to an extreme discharge of flushing oil from the until now low pressure side of the main circuit so that, in the course of the renewed pressure buildup on the high pressure side, the pressure on the low pressure side can completely collapse within a fraction of a second. The feed pump in this condition is not able to compensate for and re-supply the flushed amount discharged from the flush circuit. Due to the undersupply on the low pressure side, pipe clanging and cavitation is produced both in the feed pump as well as in the main pump, with a danger of an increased wear and tear. In order to avoid this problem, it has already been proposed that the deficit in oil is to be compensated by a pressure reservoir or a larger feed pump. Both solutions however require an undesirably high construction investment.

SUMMARY

Beginning therewith it is the task of the invention to make arrangements which ensure that the low pressure collapse in the hydraulic drive of the above-described type with closed hydraulic circuit is prevented during the reversal process with simple means.

For solving this task, the combination of characteristics set forth in claims 1 and 11 are proposed. Advantageous embodiments and further developments of the invention can be seen from the dependent claims. The solution according to the invention is based primarily upon the idea, that the flushing stream discharged from the hydraulic circuit during each of the reversal processes of the reversible pump is blocked for a short time independently of the pressure differential in the connection lines of the main pump, and subsequently again are re-opened. In order to make this possible, there is proposed in accordance with the invention a supplemental blocking mechanism, which blocks the flushing stream during the reversal process of the main pump independent of the pressure differential between the connection lines.

The blocking mechanism therein preferably responds to the reversing of the main pump as triggering control signal. A preferred embodiment of the invention envisions that on at least two ends of the drive cylinder a position indicator responsive to the passage by of the piston is provided for generating the control signal. Thereafter the blocking mechanism is, time delayed after completion of the reversal process, again deactivated. This means, that the blocking mechanism responds for example to a time delay element or a control signal produced by a reversal process of the main pump with de-activation of blocking.

A preferred embodiment of the invention envisions that the blocking mechanism is provided spring biased, preferably in the open position, in the flushing line downstream of the flushing oil pressure limiting valve. Basically it is also possible that the blocking mechanism is a one-way blocking valve provided in the flushing oil line between the reversing valve and the flushing oil pressure limiting valve.

A third possible solution envisions that the blocking mechanism includes a two-way blocking valve provided in the flushing branch upstream of the reversing valve.

It is in principle also possible that the blocking mechanism includes one pressure relief valve respectively in each of the two control lines of the reversing valve in communication with the connection lines. The pressure relief valves are simultaneously urged into their relief position upon activation, so that the control pressure (pre-controlled pressure) at the reversing valve is released towards the tank. In this case the same pressure exists on both sides of the reverse valve, so that the valve pusher or slider is brought via a spring centering into a central position and thereby the flushing branch is blocked.

BRIEF DESCRIPTION OF THE FIGURES

Figure 1:
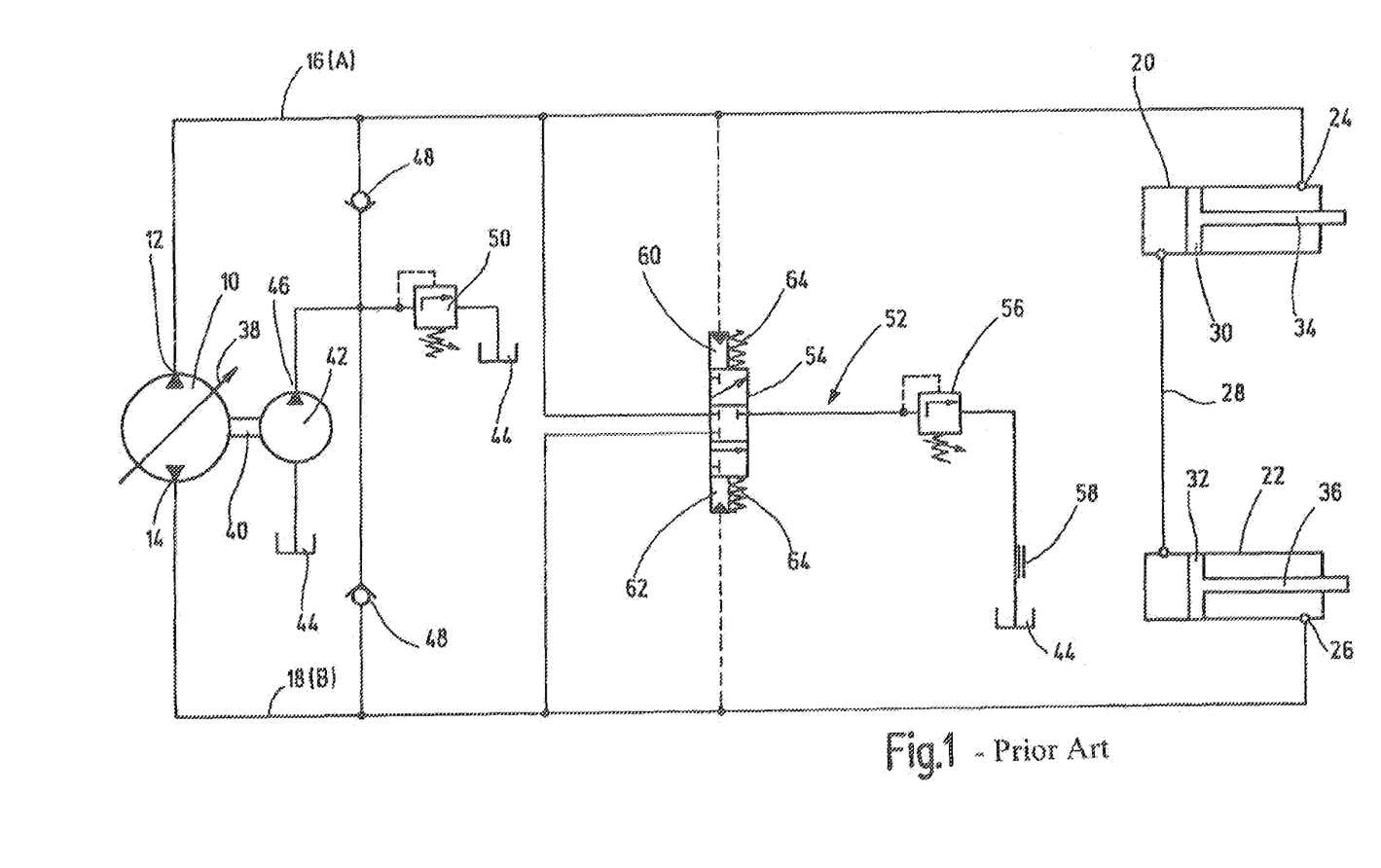
FIG. 1 a circuit diagram of a drive hydraulic for a two-cylinder thick matter pump with closed hydraulic circuit and integrated flushing branch according to the prior state-of-the-art.
Figure 4:
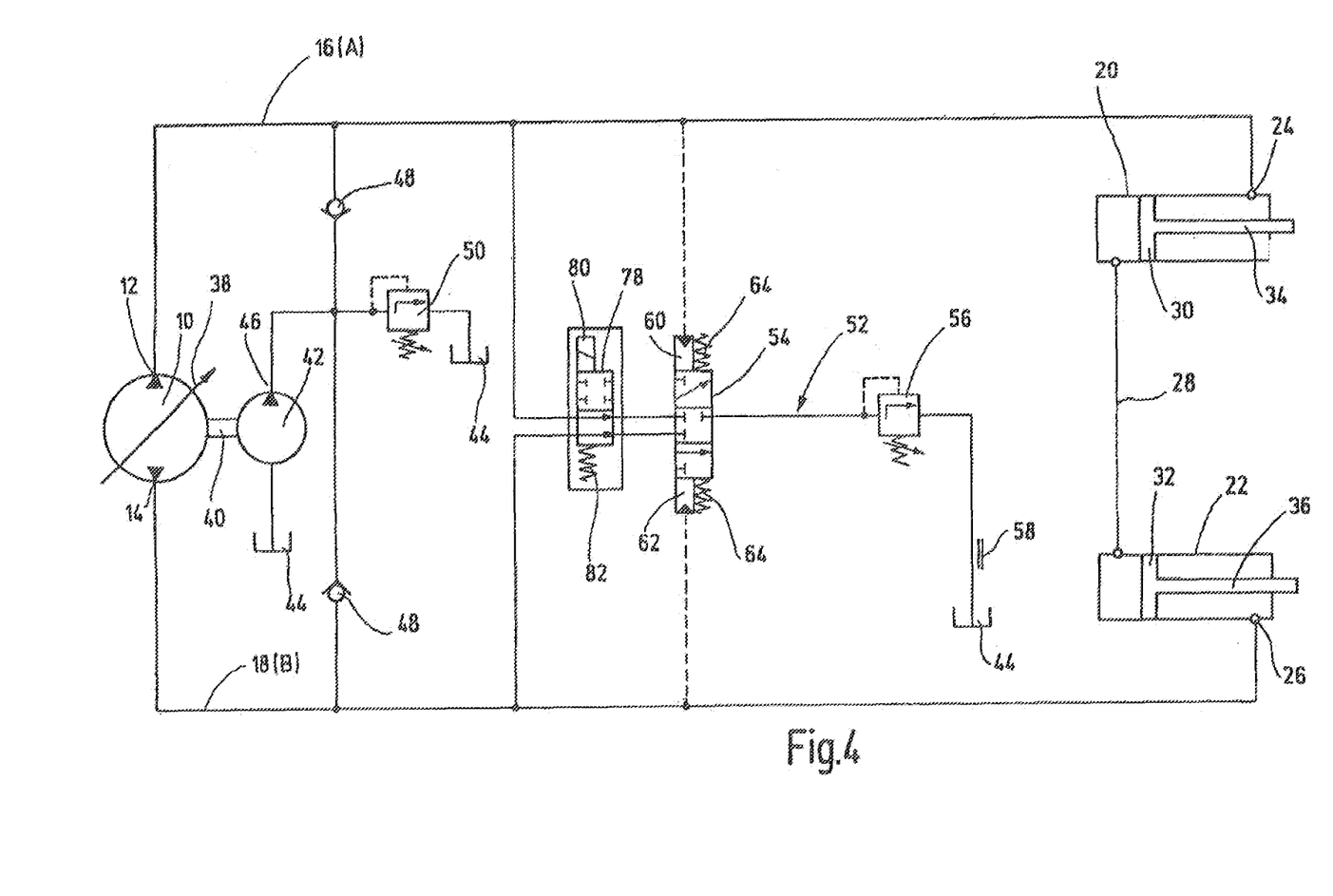
FIG. 4 a circuit diagram of a drive hydraulic according to FIG. 1 with a third blocking variant in the flushing branch.
Figure 5:
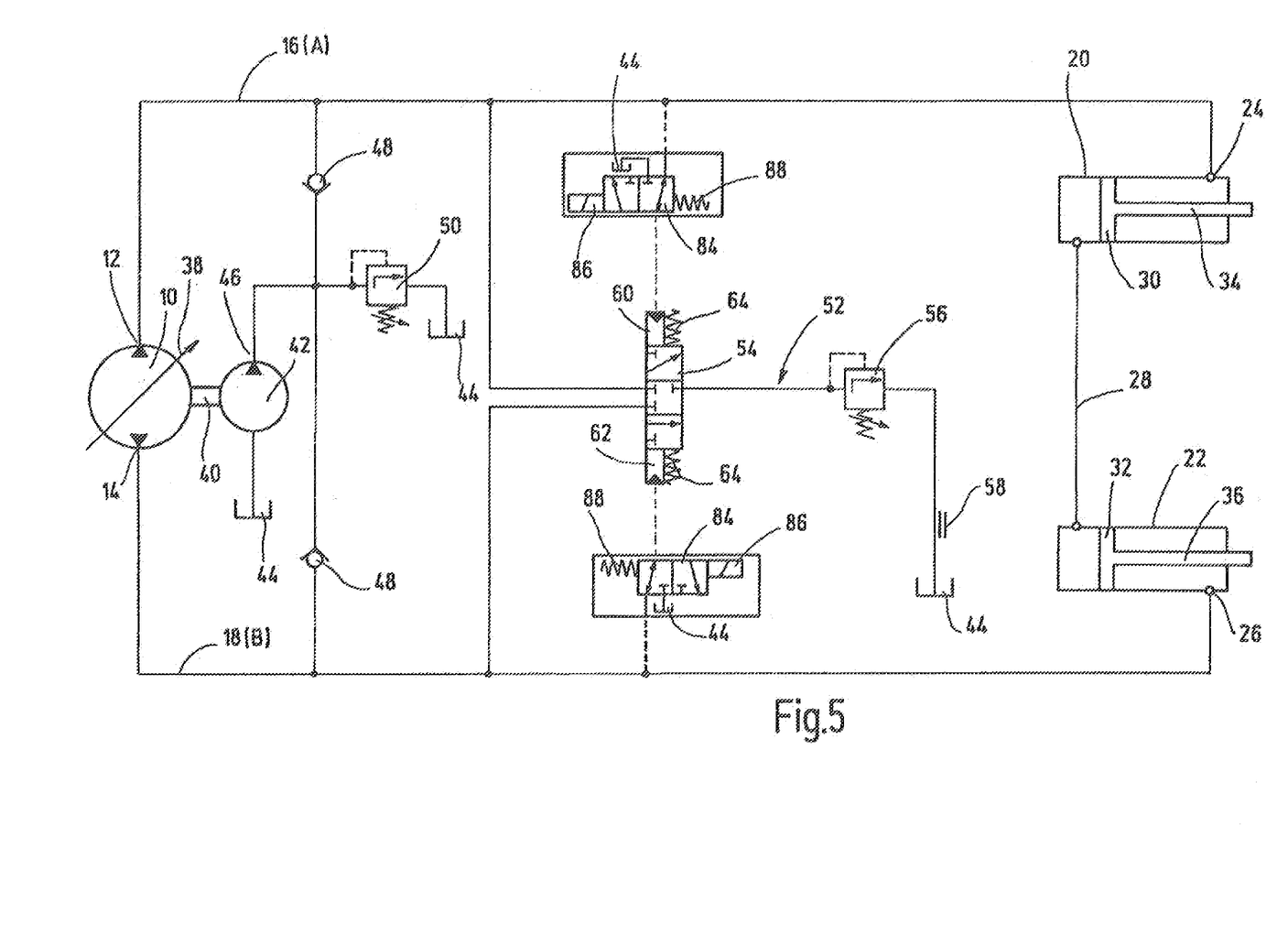
FIG. 5 a circuit diagram of a drive hydraulic according to FIG. 1 with a fourth blocking variant in the flushing branch.

In the following the invention will be described in greater detail on the basis of the illustrative examples shown in the figures. There is shown in:

FIGS. 1 and 5 show the basic circuit diagram for a drive hydraulic for a two-cylinder thick matter pump with a closed hydraulic circuit and a flushing branch.

The basic circuit includes a hydraulic pump 10 embodied as a reversing or adjustable pump, to the outlets 12, 14 of which piston-cylinder units embodied as drive cylinders 20 and 22 are connected via respectively one connection pipe 16, 18. In the illustrated embodiment the pump connections 24, 26 are respectively located on the rod end of the drive cylinder. On their opposite end the drive cylinders are connected with each other via an oscillating hydraulic line 28. A pistons 30, 32, with the associated piston rods 34, 36 of the drive cylinders 20, 22, are alternatingly driven in counterstroke via the main pump 10. For this, a pivot disk 38 of the pump is so reversed via a not shown hydro-mechanical or electro-mechanical control mechanism within the main pump that the high pressure side and the pre-tensioned low pressure side, during each of the reversing processes, change over to the other outlet 12,14. This means, that the connection lines 16, 18 are alternatingly acted upon with high pressure (HP) and pre-tensioned low pressure (LP).

The hydraulic circuit further includes a feed pump 42, motor driven via the same drive shaft 40 as the main pump 10, of which the suction side is in communication with the oil tank 44 and the pressure side 46 is in communication with the connection lines 16, 18 via feed check valve 48. The pressure side 46 of the feed pump 42 is, besides this, limited to a low pressure level (for example 34 bar) via a pressure limiting valve 50. The feed pump therewith has the task of maintaining a pre-tension on the low pressure side of the closed hydraulic circuit, as a result of which the main pump 10 is continuously supplied with hydraulic fluid on the low pressure side.

The basic circuit according to FIGS. 1 through 5 further includes a flushing branch 52, which on the inlet side is connected via a two-way valve or alternating check valve 54 to the connection lines 16, 18, and communicates, via a low pressure limiting valve 56 and the heat exchanger 58 of a cooling equipment assembly, with in the oil tank 44. The alternating check valve 54, embodied as a 3/3-way valve, is in communication with the hydraulic connection lines 16, 18 via its pre-control inlets 60, 62, in such a manner that the slider is pushed to the respective low pressure side via the currently prevailing pressure differential (Δp=HP−LP). In a special case one such slider is redirected or rerouted with a pressure differential of approximately 4 bar against the force of the centering springs 64. The pressure limiting valve 56 in the flushing branch 52 is likewise at the low pressure level. The pressure setting there is, for example, 4 bar lower than the LP-limit valve of the feed pump 42.

In the differential pressure neutral area within the 4 bar range, the reverse valve 54 switches to the central or middle position, which is the blocking position of the flush branch of the two connection lines 16, 18.

Figure 6:
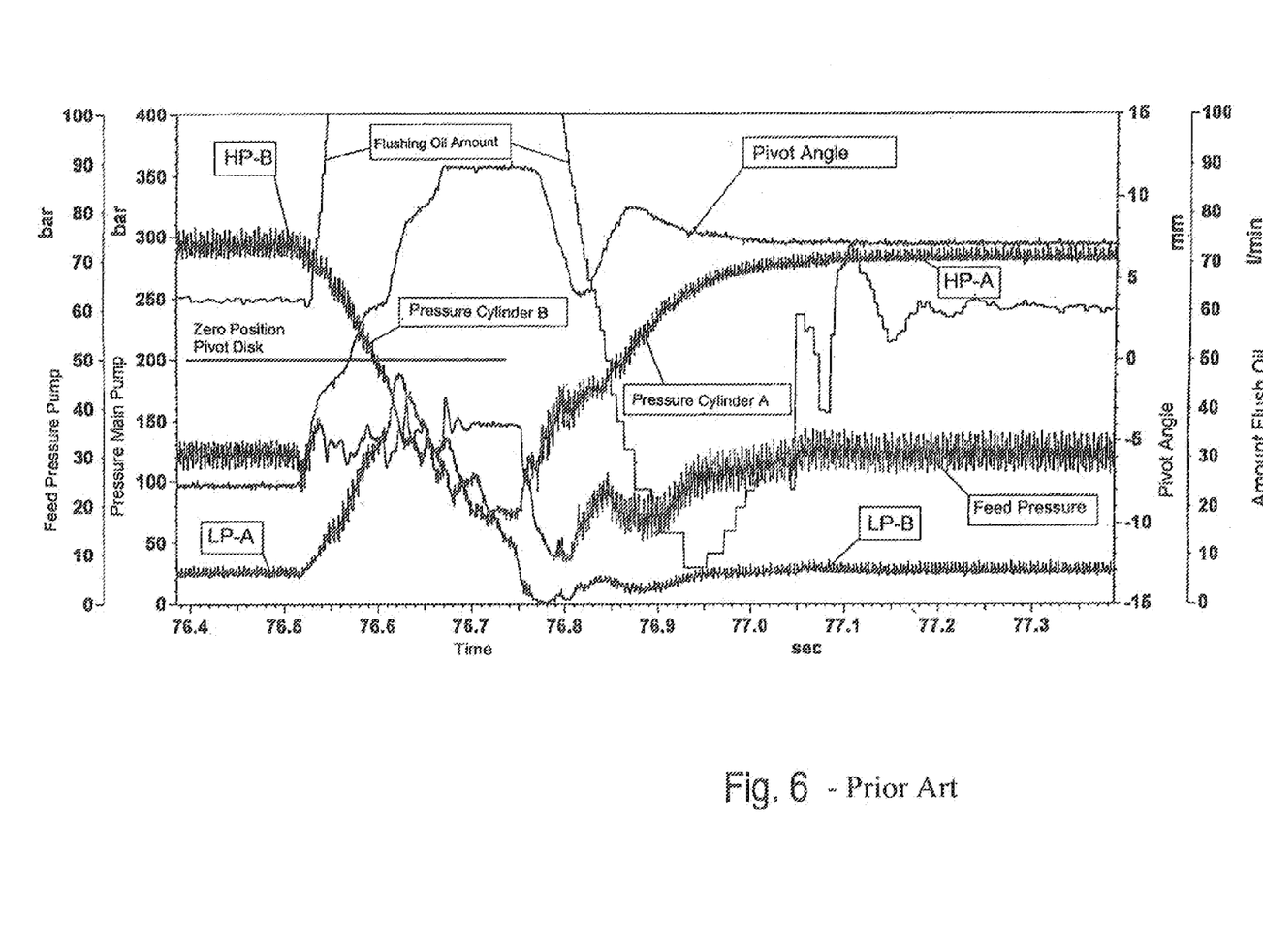
FIG. 6 a measurement diagram showing particular actual condition values of a drive hydraulic according to FIG. 1 (state-of-the-art) during the reversing process of the main pump over time.

The measurement diagram according to FIG. 6 illustrates the time sequence of certain condition values of the drive hydraulic according to FIG. 1 (state-of-the-art) during the reversing process of the main pump 10. The individual time-dependent curves illustrated individually in the diagram: pivot angle, pressure at connection pipe A and B, supply pressure, and flushing oil amount, are all respectively provided with their own ordinate scale.

In the measurement section shown in FIG. 6 the last pump stroke ends at time point 76.52 sec. Until then, the connection pipe B works under high pressure (HP-B) and the connection pipe A under low pressure (LP-A). Then the pivot angle of the pivot disk is pivoted with high speed through the zero position in the time between 76.52 and 76.57 sec and by time 76.67 to a push-over-point at approximately 12 mm. Almost without delay the low pressure first rapidly increases at connection pipe A while the high pressure on the side B, as expected, drops. It is notable that with the increase in low pressure, from the beginning of the reversing process on, a very high flush oil stream is produced, of which the peak greatly exceeds the illustrated scale in the time between 76.52 and 76.83 sec. As a result, there is not an availability of sufficient oil in the new low pressure side B for a building up of pressure, in order to build up sufficient pressure on the high pressure side A via the high pressure pump. The result is a collapse in low pressure in line B which, in the time frame 76.77 through 76.81 sec, drops all the way to zero. A consequence thereof is the occurrence cavitations in the area of the main pump. Since the supply pressure also drops to values of less than 10 bar (instead of 30 bar), pump banging can also occur there. A consequence thereof is substantial pressure oscillations also in the area of the new high pressure side A, which can lead to pressure slamming and friction wear in the pump area.

In order to avoid the disadvantages in the conventional operation of the drive hydraulic as can be seen from FIG. 6, precautionary measures are made in the illustrative embodiment shown schematically in FIGS. 2 through 5, with which the dangerous collapse in low pressure can be eliminated. In all four embodiment variations the flushing oil stream is interrupted during the reversing process with the aid of a suitable blocking mechanism.

Figure 2:
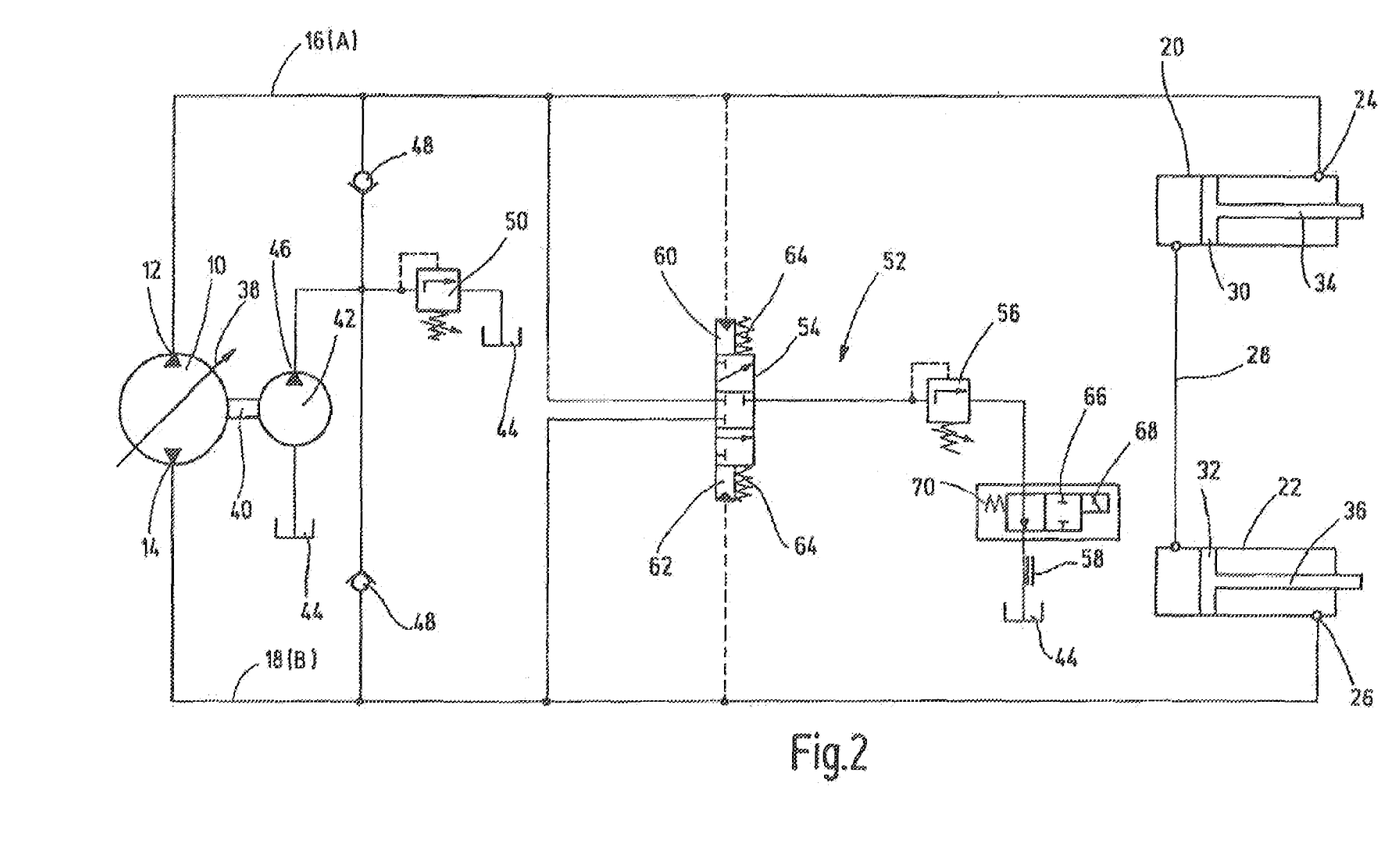
FIG. 2 a circuit diagram of a drive hydraulic according to FIG. 1 with a first blocking variant in the flushing branch.

In the embodiment according to FIG. 2 the blocking mechanism is constituted by a one-way blocking valve 66 located in the flushing branch 52 downstream of the low pressure limitation valve 56, of which the control input 68 prior to each reversing process is triggered by an end position signal initiated by the arriving piston 30 or as the case may be 32. The initiation brings about a displacement of the blocking valve slider against the force of the biasing spring 70 in the blocking position. A not shown timing element or a further initiating signal returns the blocking valve 66 again to the flow through position shown in FIG. 2 in which the flushing stream from the instantaneous low pressure side is brought into operation towards the oil tank 44.

Figure 7:
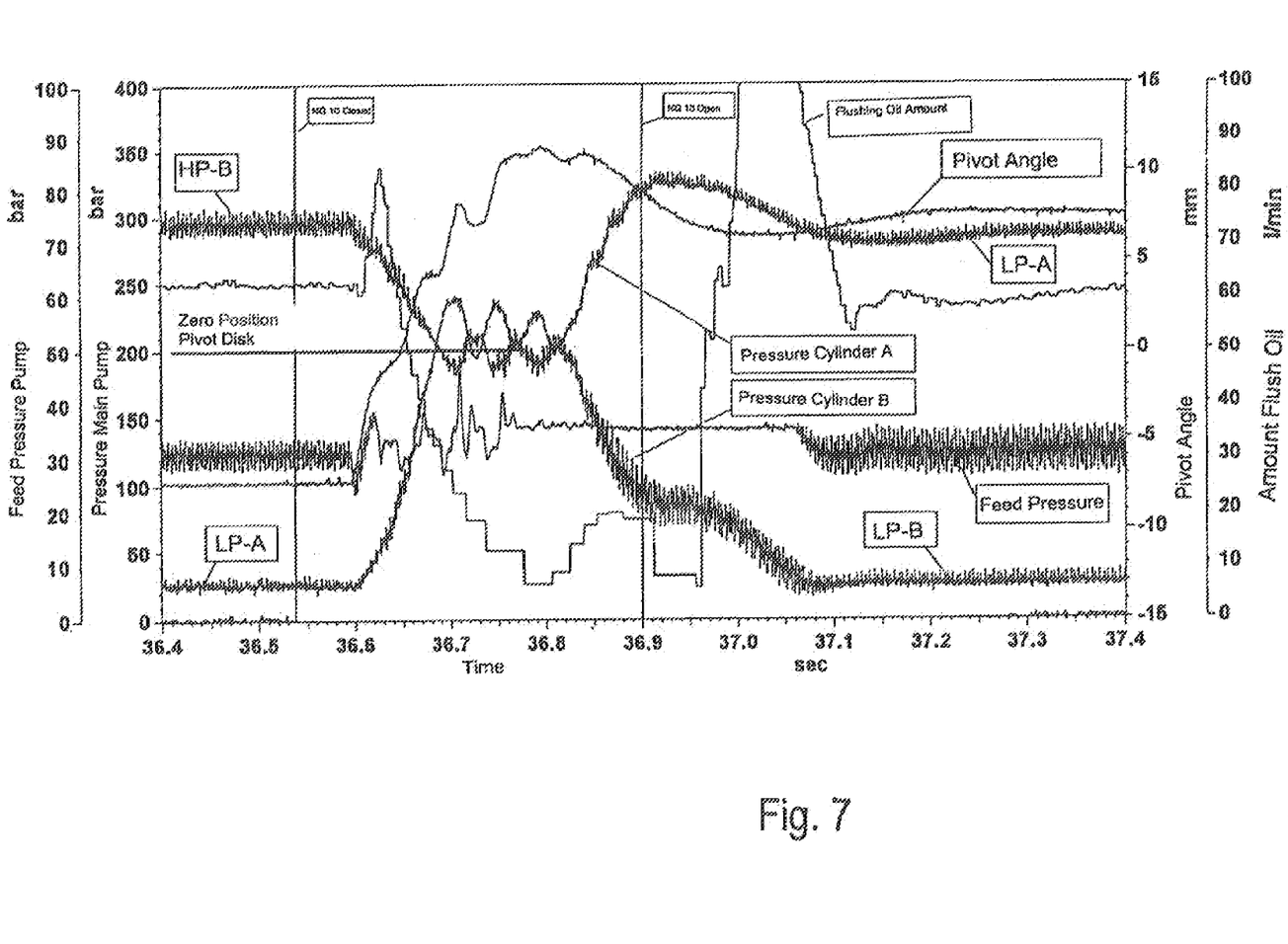
FIG. 7 a measurement diagram showing particular actual condition values of a drive hydraulic according to FIG. 2 (invention) during the reversing process over time.

The effect of the blocking valve 66 can be clearly seen from the diagram shown in FIG. 7. In this diagram the two time points 36.54 sec and 36.90 sec are recognizable, in which the blocking valve 66 is closed and is again opened. The closing of the blocking valve starts several tenths of seconds prior to the beginning of the reversing process at time point 36.60 sec. Due to the inertia of the system a small peak results in the flushing stream during the increase in the low pressure in connection pipe A, which however rapidly drops and can be prevented by the somewhat earlier closing of the blocking valve. It is however clearly recognizable, that the oil amount of the feed pump is here sufficient to avoid a pressure collapse on the low pressure side. Also, the supply pressure remains nearly constant. The low pressure side remains sufficiently pre-tensioned over the entire reversing process so that the pressure build up on the high pressure side can occur with a sufficient push-over effect (peak) in the HP-A curve between 36.9 and 37.0 sec. Due to the elevated pressure still remaining in line B during opening of the blocking valve 66, there results a short duration surge of the flushing oil amount, which in this position however has no effect on the pressure build up in the connecting connection lines. A shift of the opening time of the blocking valve to a later line point in time could, if desired, further reduce this flush oil amount.

Figure 3:
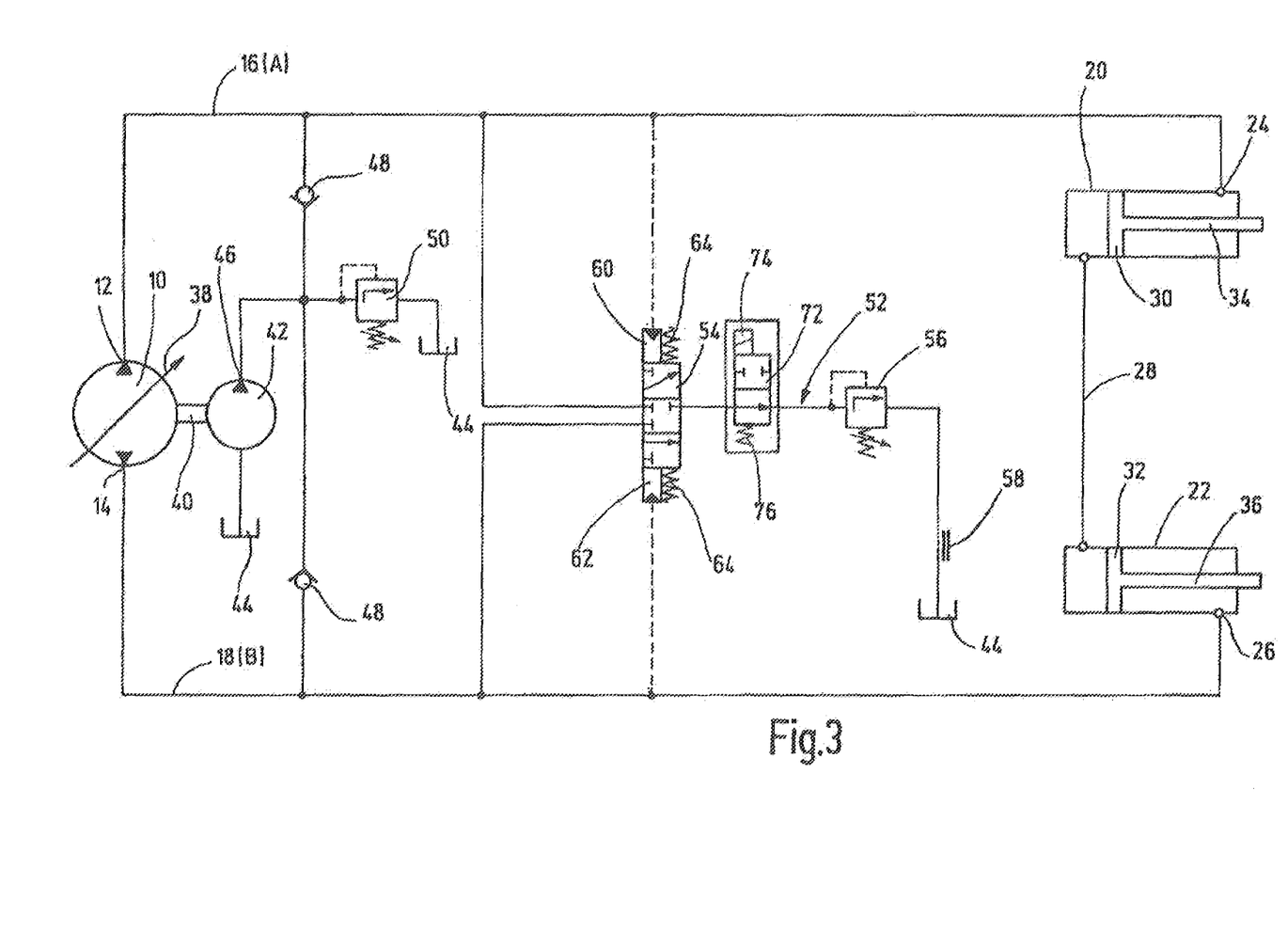
FIG. 3 a circuit diagram of a drive hydraulic according to FIG. 1 with a second blocking variant in the flushing branch.

In FIGS. 3, 4 and 5 additional embodiment variations are schematically shown for a blocking mechanism in the flushing oil branch, which produce similar result effects to the illustrative embodiment according to FIG. 2 in the time sequence of the condition parameters in the sense of FIG. 7.

Accordingly in the illustrative embodiment shown FIG. 3 a one-way blocking valve 72 of similar construction to FIG. 2 is provided in the flushing oil branch between the reversing valve 54 and the limitation valve 56. A precondition for this is that the parts 54 and 56 are separate components, between which space remains for the blocking valve 72. The blocking valve 72 is brought into its blocking position via the control input 74 against the force of the return spring 76.

Also in the case of FIG. 4 a two-way blocking valve 78 is in the flushing branch 54, this time upstream of or ahead of the reversing valve 54, which on the inlet side is connected with the two connection lines 16 and 18. Similar to the case of FIGS. 2 and 3, this blocking valve is also displaced via a control input 80 against the force of the spring 82 at the beginning of the reversing process into the blocking position, and after expiration of a pre-determined time is returned via the spring 82 into its through-put position.

In the illustrative embodiment shown in FIG. 5 the blocking function in the center position of the blocking valve 54 is used for blocking the flushing branch. For this purpose, pressure relief valves 84 are provided in the pre-control lines of the reversing valve 54, which via the control inputs 86 are controllable, thereby bring the reversing valve into its differential pressure neutral middle position against the force of a pressure spring 88 in which the flushing branch 54 is blocked. The deactivation of the pressure relief valve occurs again time delayed, after the main pump 10 had reversed with its pivot disk 38 into the opposite conveyance direction.

In summary the following can be concluded: The invention is concerned with a hydraulic drive, in particular for a two-cylinder thick matter pump. The hydraulic drive includes at least one main pump 10 embodied as a hydraulic reversing pump as well as two hydraulic actuated drive cylinders 20, 22, which, via pump connections provided at their one cylinder end are connected respectively with one connecting pipe 16, 18 of the main pump 10, forming a closed hydraulic circuit, and which at the cylinder ends lying opposite to the pump connections 24, 26 communicate with each other via a oscillating hydraulic line 28. The hydraulic drive further includes a feed pump 42, with which pressure oil is supplied out of the oil tank to the hydraulic circuit on the side which at the time is the low pressure side, as well as a flushing branch 52, via which a flushing stream is branched off from the instantaneous low pressure side with limited pressure into the oil tank 44. In order to avoid low pressure collapses during the reversing process of the main pump 10, the flushing stream is blocked and is then opened again after a time delay following the respective reversing process of the main pump 10 independent of the pressure differential in the connecting connection lines.

The invention claimed is:

1. A hydraulic drive for a two-cylinder pump, including
two drive cylinders (20, 22) in a closed hydraulic circuit alternatingly acted upon in counter-stroke with hydraulic fluid under high pressure (HP) and low pressure (LP),
an oil tank,
a feed line for feeding a fresh stream of oil with limited pressure from the oil tank (44) into the side which is currently the low pressure side of the hydraulic circuit,
a flushing line for a flushing oil stream branched off from the current low pressure side and discharging into the oil tank,
wherein during each reversal process of the main pump (10) the flushing oil stream is blocked for a period of time independent of the pressure differential in the connection lines (16, 18) of the main pump (10).

2. A hydraulic drive according to claim 1,
wherein two hydraulic actuated drive cylinders (20, 22) embodied as piston cylinder units are connected at their one cylinder end, via pump connections (24, 26), with respectively one connection line (16, 18) of the main pump (10), forming a closed hydraulic circuit, and at their other cylinder ends communicate with each other via an oscillating hydraulic line (28),
wherein the main pump (10) is connected with a control mechanism for alternatingly reversing the conveyance direction of the hydraulic fluid, alternatively building up a high pressure (HP) and a low pressure (LP) in the two connection lines (16, 18) in counter stroke,
further including a hydraulic feed pump (42), of which the suction inlet is in communication with an oil tank (44) and of which the pressure outlet (46) is limited to a low pressure level and communicates via a one-way valve (48) with the two connection lines (16, 18) of the main pump (10), and
wherein the a flushing branch (52) is integrated in the hydraulic circuit, which on the outlet side, with interposition of a pressure limitation valve (56), communicates with the oil tank (44), and on the inlet side is controlled by a control valve (54), which is controlled by the pressure differential existing between the connection lines (16, 18) such that in the case of a pressure differential it opens the connection to the low pressure side to allow discharge a flushing oil stream into the oil tank, and in the case of a pressure differential neutral central position is preferably blocked, and
wherein a blocking mechanism (66;7;78;84), temporarily blocks the flushing stream during the reversing process of the main pump (10) independent of the pressure differential prevailing between the connection lines (16, 18).

3. A hydraulic drive according to claim 1, wherein the blocking mechanism responds to a main pump (10) reversing control signal as trigger for activation of a blocking process.

4. A hydraulic drive according to claim 2, wherein the blocking mechanism is deactivated with time delay after termination of the reversing process.

5. A hydraulic drive according to 2, wherein the blocking mechanism responds by deactivation of blocking to a time delay element or a control signal produced by the reversal of the main valve (10).

6. A hydraulic drive according to 1, wherein on at least two ends of the drive cylinders (20, 22) a position indicator responsive to passage by of a piston is provided for providing a control signal.

7. A hydraulic drive according to claim 2, wherein the blocking mechanism includes a blocking valve (66) provided in the flushing branch (52) downstream of the pressure limiting valve (56).

8. A hydraulic drive according to claim 2, wherein the blocking mechanism includes a blocking valve (72) provided in the flushing branch (52) between the reversing valve (54) and the pressure limiting valve (56).

9. A hydraulic drive according to claim 2, wherein the blocking mechanism includes a blocking valve (78) provided in the flushing branch (52) upstream of the reversing valve (54).

10. A hydraulic drive according to claim 2, wherein the blocking mechanism includes one pressure relief valve (84) respectively provided in the two pre-control lines of the reversing valve (54) connected with the connecting connection lines (16, 18).

11. A hydraulic drive according to claim 6, wherein the blocking and/or pressure relief valve (66, 72, 78, 84) is embodied as signal controlled directional valves spring biased in the through-put direction and signal controlled in the blocking or pressure relief direction.

12. A process for controlling hydraulic drives for two-cylinder pumps, comprising
   alternatingly acting on two drive cylinders (20, 22) in a closed hydraulic circuit with hydraulic fluid under pressure via connection lines (16, 18) of at least one main pump (10) embodied as a reversible pump,
   supplying fresh oil from an oil tank under limited pressure to the current low pressure side of the hydraulic circuit and
   discharging a flushing stream branched off from the current low pressure side with limited oil pressure into the oil tank,
   wherein the flushing oil stream is temporarily blocked and subsequently again unblocked during each reversing process of the main pump (10) independent of the differential pressure in the connection lines (16, 18) of the main pump (10).

* * * * *